United States Patent [19]

Honda

[11] Patent Number: 4,666,421
[45] Date of Patent: May 19, 1987

[54] DRIVE CHAIN BELT

[75] Inventor: Shoichi Honda, Tokyo, Japan

[73] Assignees: Honda Giken Kogyo Kabushiki Kaisha, Tokyo; Daido Kogyo Co., Ltd., Kaga, Both of Japan

[21] Appl. No.: 795,411

[22] Filed: Nov. 6, 1985

[30] Foreign Application Priority Data

Nov. 12, 1984 [JP] Japan .............................. 59-171798[U]

[51] Int. Cl.$^4$ ............................................. F16G 13/02
[52] U.S. Cl. ..................................................... 474/242
[58] Field of Search ................. 474/201, 242, 244, 245

[56] References Cited

U.S. PATENT DOCUMENTS 3,364,767  1/1968  Bredschneider et al. ....... 474/242 X
3,916,709  11/1975  Steuer et al. ..................... 474/242

Primary Examiner—Stephen J. Novosad
Attorney, Agent, or Firm—Oblon, Fisher, Spivak, McClelland & Maier

[57] ABSTRACT

A drive chain belt is fitted around a V-type pulley with a pair of inclined walls movable toward and away from each other. The chain belt comprises an endless chain which is formed by pivotally connecting a plural number of rows of link members by pins. An inner extension is provided on an appropriate number or each of the link members projecting radially inward of the pulley when the chain is fitted thereon. An opening is formed in each one of the inner extension so as to fit V-blocks in the openings. Each V-block has an inclined end face adapted to be brought into engagement with the inclined walls of the V-pulley to increase the contact area to the inclined walls of the pulley. Interference portions are a provided on opposing end faces of the link members in at least one row thereof to prevent outward deflection of the chain belt beyond a predetermined angle.

5 Claims, 8 Drawing Figures

DRIVE CHAIN BELT

BACKGROUND OF THE INVENTION

1. Field of the Invention

This invention relates to a drive chain belt for V-pulley type stepless transmissions.

2. Description of the Prior Art

The drive belts which are used for stepless transmissions can be classified into a rubber type and a metal type, of which the metal type drive belts are preferred in those cases where heat resistance and durability are important factors.

The metal type drive belt consists of a flexible endless chain formed by a plural number of rows of link members in the form of metal plates which are pivotally connected end to end by a pin inserted at each pitch. The drive chain is passed around V-type pulleys on a drive shaft and a driven shaft of a transmission, between opposing inclined inner walls which are movable toward and away from each other to vary steplessly the speed of power to be transmitted from the drive shaft to the driven shaft. In this connection, the transmission of power from the drive shaft to the driven shaft has thus far been effected by the frictional force which is produced by abutting engagement of the opposite end portions of the pins with the inclined inner walls of the pulleys. However, the above-mentioned arrangement involves problems in that the contact area of the link plate connecting pins with the V-type pulleys is insufficient to ensure satisfactory power transmission efficiency, and in that the power transmitting operation is instabilized by variations in contact area of the pins relative to the pulleys, which are caused depending upon the contacting positions of the pins with a circular shape in section. In addition, there has been a problem of vibrations resulting from the clenching action of the pulleys on the chain belt.

OBJECTS OF THE INVENTION

With the foregoing in view, the present invention has as its object the provision of a drive chain belt which is improved in transmission efficiency and which can suppress the above-mentioned vibrations.

It is another object of the present invention to provide a drive chain belt with satisfactory durability, which can prevent damages to the link connecting pins or other component parts to a significant degree.

SUMMARY OF THE INVENTION

According to the invention, tne foregoing objectives are attained by a drive chain belt to be fitted around a V-type pulley having a pair of inclined wall surfaces movable toward and away from each other, the drive chain belt being characterized by the provision of: an endless chain formed by a multitude of link members arranged in plural number of rows and connected end to end by pins; an inner extension projecting radially inward from an appropriate number of said link members when fitted on said pulley; an opening formed in each one of said inner extensions; V-blocks fitted in said openings and having inclined end faces adapted for engagement with said inclined walls of said V-pulley; and interference portions at opposing ends of said link members at least in one of the rows thereof for suppressing outward deflections of said chain belt beyond a predetermined angle.

The above and other objects, features and advantages of the invention will become apparent from the following description and the appended claims, taken in conjunction with the accompanying drawings which show by way of example only preferred embodiments of the invention.

DESCRIPTION OF PREFERRED EMBODIMENTS

Figure 1:
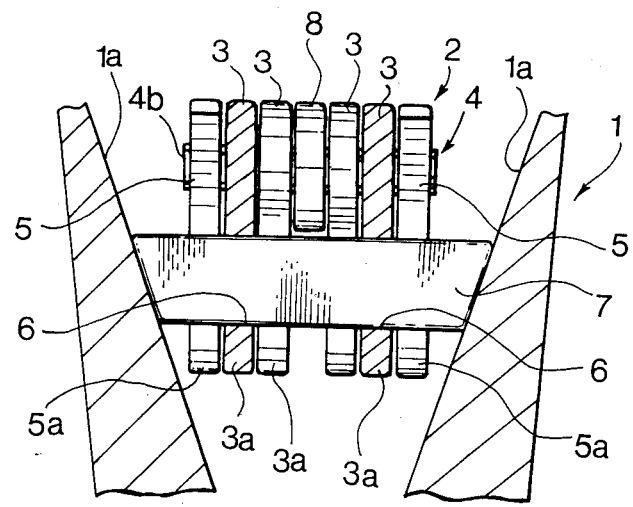
FIG. 1 is a sectional view of a drive chain belt according to the invention, fitted in a V-type pulley.
Figure 2:
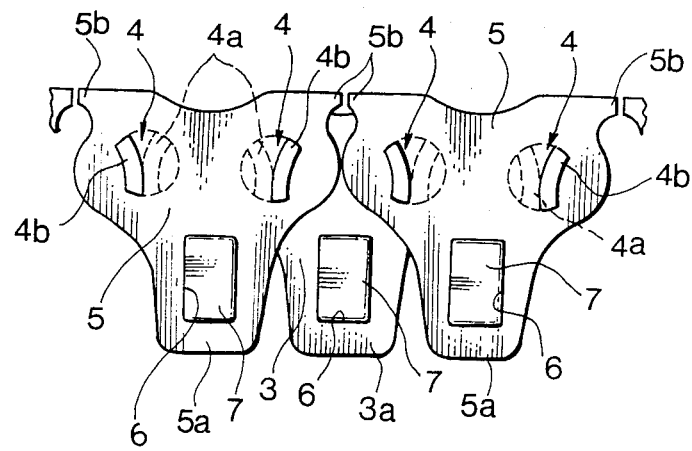
FIG. 2 is a fragmentary front view of the chain belt.
Figure 3:
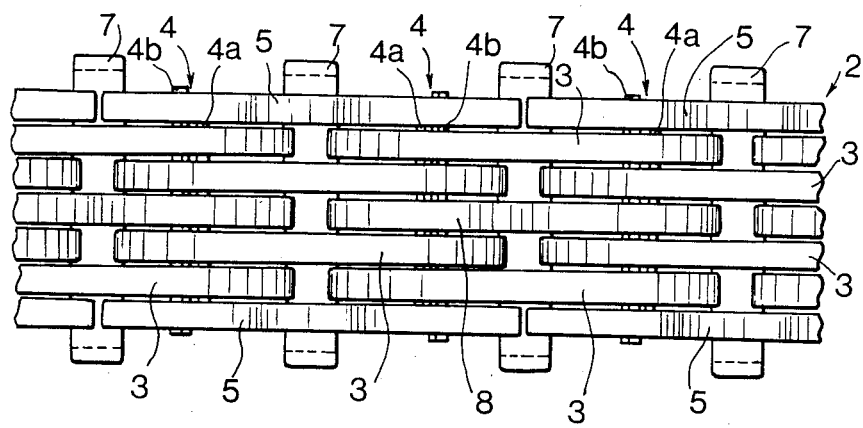
FIG. 3 is a plan view of the chain belt of FIG. 2.

Referring first to FIG. 1, indicated at 1 is a V-type pulley with a pair of inclined inner walls 1a converging in a radially inward direction and movable toward and away from each other. As seen from FIGS. 2 and 3, a chain belt 2 which is passed around the pulley 1 consists of a plural number of rows of metal link plates 3 which are connected into an endless multi-joint body by pins 4, the link plates in one row being staggered by a half pitch from the link plates in adjacent rows. The pins 4 each consists of, for example, a joint pin 4a and a rocker pin 4b which are in rolling contact with each other. The joint pin 4a is passed through the link plates 3 of the respective rows, while the rocker pin 4b which is also passed through these link plates 3 has the opposite end portions thereof fitted in and fixed in position, for example, by caulking or other suitable means in guide link plates 5 which are located in rows on the outer sides of the link plates 3.

Figure 4A:
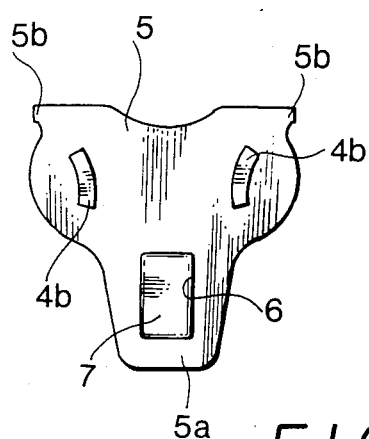
FIG. 4 (A), (B) and (C) are respectively front views of a guide link plate, one type link plate and another type link plate constituting the drive chain belt.
Figure 4B:
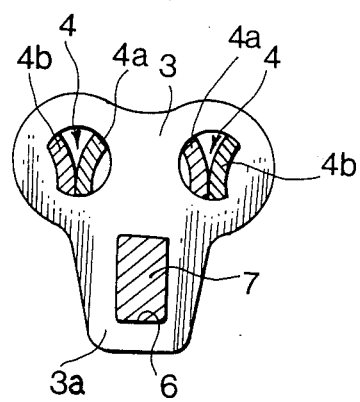
Figure 4C:
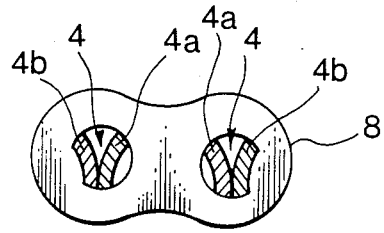

The link plates 3 and guide link plates 5 are provided with lower extensions 3a and 5a as shown in FIGS. 4(A) and 4(B), respectively, which are projected radially inward when the chain belt 2 is fitted around the pulley 1. The extensions 3a and 5a are provided with openings 6 in equidistant positions in the respective end portions to receive V-blocks 7. The openings 6 and the V-blocks 7 which are fitted in the openings 6 are formed in a rectangular or elliptic shape having the longer side thereof in the radial direction of the pulley. The V-blocks 7 are fitted in the openings 6 by press-in fit or other suitable means to fix the V-blocks 7 relative to the link plates 3 and the guide link plates 5. The opposite end faces of the V-blocks 7 are tapered with the same angle of inclination as the inclined inner walls 1a of the pulley 1 to transmit power between the chain belt 2 and pulley 1 by the frictional contact of the end faces of the V-blocks 7 with the inner walls 1a and 1a of the pulley 1. For the purpose of reducing the weight of the chain belt 2, link plates 8 without lower extensions may be inserted in part of the chain belt 2 as shown particularly in FIG. 4(C).

Since the V-blocks 7 are elongated in the radial direction, they can contact the inclined inner walls 1a of the pulley 1 through a large contact area. Further, contacting end faces of the V-blocks 7 have a substantially constant length in the radial direction, so that a large contact area is constantly maintained against the V-type pulley of truncated cone shape, ensuring efficient power transmission in a stabilized state. In addition, as the pitch circle of the V-blocks 7 is smaller in diameter than that of the pins 4, the inward moment of the V-blocks becomes larger, increasing the contact pressure of the V-blocks 7 against the pulley 1 and transmitting large power from the drive shaft to the chain belt 2 and from the chain belt 2 to the driven shaft with high efficiency without causing slips. Another advantage accruing from the increase of the contact area of the chain belt 2 with the pulley 1 is the improved stability of the chain belt 2 which is passed around the pulley 1.

During operation, the chain belt 2 undergoes outward deflections or swerving in a radially outward direction as it leaves the V-pulley by the phenomenon of chain clenching of the V-pulley under the influence of the inertial force or vibrations. In this connection, if the V-blocks 7 are located in a radially inner portion of the chain belt 2 for contact with the pulley 1 to increase their contact area with the pulley 1 as described hereinbefore, the link plates 3 and guide link plates 5 will tend to make larger turns due to the clenching phenomenon. This develops the outward deflections of the chain belt 2 by the afore-mentioned clenching phenomenon to a considerable degree, producing noises by intensified vibrations or deteriorating the durability of the chain belt 2. For the purpose of suppressing such outward deflections, the guide link plates 5 which are provided at the opposite sides of the chain belt 2 are provided with projections 5b which extend toward preceding and succeeding guide link plates at a position on the outer side of the pitch circle through the pins 4, the projections 5b serving as an interference member to be abutted against an opposing projection 5b to suppress the outward deflections of the chain belt 2. Consequently, it becomes possible not only to secure excellent performance quality in speed variation without transmission losses but also to reduce the loss of power transmission by elimination of the tensioner which causes a considerable loss in power transmission by frictional contact with the chain belt 2. Further, the chain belt of the invention has advantages in that its construction is simplified, and noises as well as damages to the component parts of the chain are suppressed.

Figure 5:
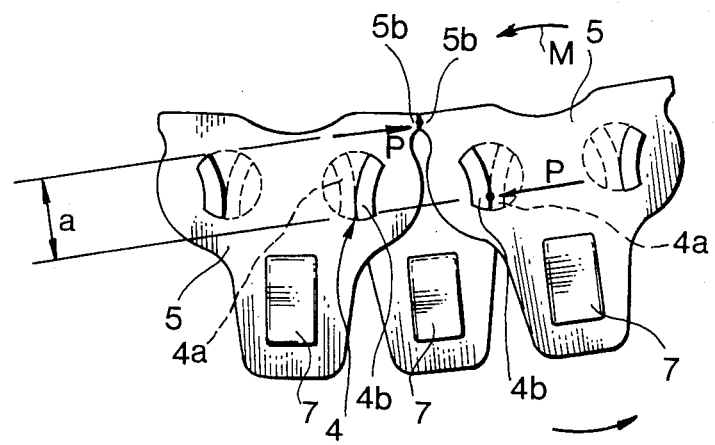
FIG. 5 is a diagrammatic fragmentary view of the chain belt, employed for explanation of its operation.

Furthermore, where the pivot pins are constituted by a rocker pin and a joint pin as described hereinbefore, the rolling movements of the rocker pin 4a and joint pin 4b are blocked as soon as the outward deflection exceeds a certain angle, exerting a compressive load P as a reaction force of the moment M which causes the outward deflection as shown in FIG. 5, namely, a force of $M = Pa$ (where a is the distance between the contact point of the rocker pin 4b and joint pin 4a and the center of the back side of the rocker pin). In this connection, generally the value of a is small, so that the moment M necessarily becomes large in transmission of large power, exerting a large compressive force P which might damage the pins and pin receiving holes. However, in the present invention, the outward deflection is restricted by the interfering portions, and the above-mentioned distance a applies to the distance between the contact point of the rocker pin and joint pin and the interfering portions. It follows that the compressive load P can be reduced remarkably by providing the interfering portions in a position spaced from the contact point of the rocker and joint pins, for the purpose of improving durability of the chain belt 2.

In this instance, it is preferred that, for suppression of the outward deflections, the projections 5b which constitute the interfering portions are in contact with the opposing interfering portions when the chain belt 2 is in a horizontal state. However, in consideration of the errors in the machining and assembling stages, they are not necessarily required to be in contact with each other to produce the effect of suppressing the outward deflections in a practical degree. Existence of a small gap between the opposing projections 5b serves to smoothen the operation of the chain belt 2 and prevent the projections 5b from being damaged by imposition of an unduly large load.

Figure 6:
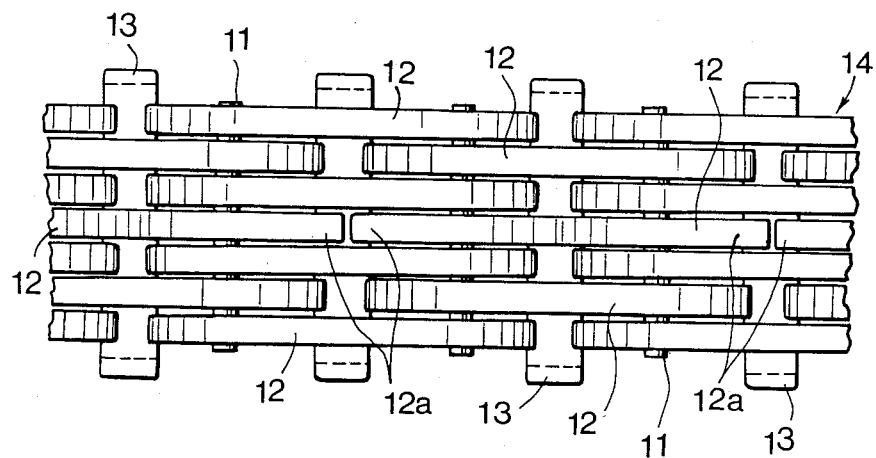
FIG. 6 is a fragmentary plan view of a drive chain belt in another embodiment of the invention.

The above-described pins may be constituted by a rod-like pin 11 as shown in FIG. 6, instead of the rocker and joint pins 4a and 4b. In such a case, there is no need for providing the guide link plates, and the chain belt 14 can be formed of a plural number of rows of link plates 12 and V-blocks 13, with the projections or interference members 12a formed either in center portions or over the entire lengths of the link plates 12.

What is claimed is:

1. A drive chain belt to be fitted around a V-type pulley having a pair of inclined walls movable toward and away from each other, said chain belt comprising:
  (a) an endless chain formed by pivotally connecting a plurality of rows of link members by pins, said endless chain having a pitch circle and each of said link members having a front end and a rear end;
  (b) inner extensions provided on an appropriate number of said link members, said inner extensions projecting radially inwardly of the pulley when said endless chain is fitted thereon;
  (c) an opening formed in each one of said inner extensions at a position at a position on the inner side of the pitch circle of said endless chain;
  (d) V-blocks fitted in said openings, said V-blocks being provided with inclined end faces adapted for engagement with the inclined walls of the V-pulley when said endless chain is fitted thereon; and
  (e) interference projections provided on opposing end faces of said link members in at least one row thereof at positions on the outer side of the pitch circle of said endless chain to prevent outward deflection of said endless chain beyond a predetermined angle.

2. The chain belt of claim 1, wherein:
  (a) said plural number of rows of link members include two opposite outermost rows and
  (b) said interference projections are provided on said link members in said opposite outermost rows.

3. The chain belt of claim 1, wherein said interference projections are in the form of at least one projection provided either at the front end or the rear end of each one of said link members and extending toward the preceding or succeeding link member.

4. The chain belt of claim 1, wherein each one of said pins is constituted by a joint pin and a rocker pin in rolling contact with each other.

5. The chain belt of claim 4, wherein said interference projections are provided in positions spaced from the contact point of corresponding ones of said joint and rocker pins.

* * * * *